US009222562B2

(12) United States Patent
Hirata et al.

(10) Patent No.: US 9,222,562 B2
(45) Date of Patent: Dec. 29, 2015

(54) OUTPUT MEMBER AND MULTI-SHAFT DRIVING DEVICE

(75) Inventors: Takafumi Hirata, Yokohama (JP);
Ryohei Shigematsu, Yokohama (JP);
Takahiro Fujii, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 29 days.

(21) Appl. No.: 13/991,866

(22) PCT Filed: Dec. 8, 2011

(86) PCT No.: PCT/JP2011/078458
§ 371 (c)(1),
(2), (4) Date: Jun. 5, 2013

(87) PCT Pub. No.: WO2012/077759
PCT Pub. Date: Jun. 14, 2012

(65) Prior Publication Data
US 2013/0255441 A1  Oct. 3, 2013

(30) Foreign Application Priority Data

Dec. 8, 2010  (JP) ................. 2010-273840

(51) Int. Cl.
*F16D 3/06*     (2006.01)
*F16H 55/06*    (2006.01)
(Continued)

(52) U.S. Cl.
CPC ............ *F16H 37/065* (2013.01); *B60N 2/0296* (2013.01); *F16D 3/06* (2013.01);
(Continued)

(58) Field of Classification Search
CPC ..... F16H 57/021; F16H 37/065; F16D 11/08; F16D 11/10; F16D 11/04; F16D 2023/123; B60N 2/0296; B60N 2/42754; B60N 2/42763; B60N 2205/30
USPC .............. 74/335, 337.5, 423, 665 GB, 665 A, 74/665 B, 665 C, 665 F, 665 M, 665 P, 664; 297/344.1, 344.11–344.13, 344.15, 297/344.17
See application file for complete search history.

(56) References Cited

U.S. PATENT DOCUMENTS 2,351,219 A * 6/1944 McMullen ................. 475/9
4,895,052 A * 1/1990 Gleasman et al. ............ 475/7
(Continued)

FOREIGN PATENT DOCUMENTS

EP    1484152 A1    12/2004
JP    S52-164671 U  12/1977
(Continued)

OTHER PUBLICATIONS

Extended Search Report in EP Application No. 11847146.5 issued Apr. 25, 2014.
(Continued)

*Primary Examiner* — Ha D Ho
*Assistant Examiner* — Jude Agendia
(74) *Attorney, Agent, or Firm* — Knobbe Martens Olson & Bear LLP

(57) ABSTRACT

To provide a multi-shaft driving device that aims for a lightening of weight and lowering of cost as compared with conventional structures. In a structure in which, when a movable shaft (40) is slidably installed at an output shaft (20) and advances toward an input-side bevel gear (14), an output-side bevel gear (50) of a distal end side of the movable shaft (40) meshes-together with the input-side bevel gear (14), and the movable shaft (40) rotates and rotation of this movable shaft (40) is transmitted to the output shaft (20), the movable shaft (40) and the output-side bevel gear (50) are molded integrally of resin, and the output shaft (20) also is formed of resin, and the movable shaft (40) is slidably exteriorly placed on an outer peripheral side of the output shaft (20).

7 Claims, 10 Drawing Sheets

(51) Int. Cl.
*F16H 55/20* (2006.01)
*F16H 37/06* (2006.01)
*B60N 2/02* (2006.01)

(52) U.S. Cl.
CPC ............... *F16H 55/06* (2013.01); *F16H 55/20* (2013.01); *F16H 2055/065* (2013.01); *Y10T 74/19088* (2015.01); *Y10T 74/19688* (2015.01)

(56) References Cited

U.S. PATENT DOCUMENTS

| | | | | |
|---|---|---|---|---|
| 5,009,296 | A | * | 4/1991 | Ohkawa et al. .................. 192/20 |
| 5,129,275 | A | * | 7/1992 | Park ................................. 74/417 |
| 5,163,734 | A | * | 11/1992 | Hakansson .................... 297/330 |
| 5,509,866 | A | * | 4/1996 | Weightman .................... 475/343 |
| 7,357,747 | B2 | * | 4/2008 | Hamilton ....................... 475/221 |
| 7,530,171 | B2 | * | 5/2009 | Baron et al. .................... 30/43.6 |
| 7,734,375 | B2 | * | 6/2010 | Buehler et al. ................ 700/245 |
| 8,590,426 | B2 | * | 11/2013 | Li et al. ......................... 74/665 H |
| 8,616,088 | B2 | * | 12/2013 | Teng et al. ..................... 74/665 C |
| 2002/0018671 | A1 | * | 2/2002 | Nakahara et al. .............. 399/256 |
| 2003/0230919 | A1 | * | 12/2003 | Park ............................ 297/344.1 |

FOREIGN PATENT DOCUMENTS

| | | |
|---|---|---|
| JP | S54-41898 | 12/1979 |
| JP | 58-97528 A | 6/1983 |
| JP | 62-110027 A | 5/1987 |
| JP | 64-30850 A | 2/1989 |
| JP | 6-87363 A | 3/1994 |
| JP | 6-43400 U | 6/1994 |
| JP | 6-156123 A | 6/1994 |

OTHER PUBLICATIONS

Office Action issued in Corresponding Chinese Application No. 201180058794.1 dated Feb. 17, 2015.

* cited by examiner

OUTPUT MEMBER AND MULTI-SHAFT DRIVING DEVICE

CROSS-REFERENCE TO RELATED APPLICATIONS

This application is the U.S. National Phase under 35. U.S.C. §371 of International Application PCT/JP2011/078458, filed Dec. 8, 2011, which claims priority to Japanese Patent Application No. 2010-273840, filed Dec. 8, 2010. The disclosures of the above-described applications are hereby incorporated by reference in their entirety. The International Application was published under PCT Article 21(2) in a language other than English.

TECHNICAL FIELD

The present invention relates to a multi-shaft driving device that drives plural output shafts by one motor and that is suitably applied to, for example, a power seat for a vehicle or the like, and relates to an output member that is suitably applied to the multi-shaft driving device.

BACKGROUND ART

Vehicle seats are often of a form in which positions of plural parts thereof can be adjusted, such as sliding the entire seat in the front-back direction, vertically moving the height of the seating surface, reclining the seatback and the like, so as to be able to suit the physique and posture of the passenger. There were structures in which the adjustment of these movable regions was carried out manually, but power seats that are adjusted by the driving of motors are provided as more convenient structures.

In order to independently drive plural movable regions respectively, there has been conceived a structure that connects motors one-by-one to each output shaft that is connected to a movable region, but in such a structure, the number of motors becomes large. Thus, it would be efficient if plural output shafts were to be driven by one motor.

To this end, there are known structures in which the driving force of a motor is transmitted via clutches to respective output shafts that are connected to plural movable regions, and the respective movable regions are driven selectively by disconnecting the clutches as described in patent documents such as Japanese Patent Application Laid-Open (JP-A) No. 58-97528, JP-A No. 6-87363, JP-A No. 62-183504, and JP-A No. 6-156123.

DISCLOSURE OF INVENTION

Technical Subject

With the above-described conventional multi-shaft driving devices, there is dissatisfaction with regard to the weight being heavy and the cost being high, and improvements are desired.

The present invention was made in view of the above-described circumstances, and a subject thereof is to provide an output member and a multi-shaft driving device that devise a lightening of weight and lowering of costs as compared with conventional structures.

Solution Addressing Subject

An output member of a first aspect comprises: an output shaft that is made of resin and that is applied to a mechanical device for a vehicle; a movable shaft that is made of resin and is installed at the output shaft; an output-side clutch member that is made of resin and is provided integrally with the movable shaft; a guide member that is structured by a shape of an outer peripheral surface of one of the output shaft and the movable shaft and a shape of an inner peripheral surface of another of the output shaft and the movable shaft, and that makes the movable shaft able to slide in an axial direction and unable to rotate relatively, with respect to the output shaft, wherein the inner peripheral surface of the other engages with the outer peripheral surface of the one of the output shaft and the movable shaft; and an urging member that urges the movable shaft in one direction or a direction opposite to the one direction in the axial direction.

In the first aspect, the movable shaft that is installed at the output shaft is made to be slidable in the axial direction and unable to rotate relatively, with respect to the output shaft by the guide portion. The movable shaft is urged in one direction or the opposite direction to the one direction in the axial direction by the urging member. The output-side clutch member is provided integrally with this movable shaft. When this output-side clutch member is rotated, the rotation is transmitted to the output shaft via the guide portion from the movable shaft that is integral with the output-side clutch member, and the output shaft rotates.

Here, the above-described guide portion is structured by the shape of the outer peripheral surface of one among the output shaft and the movable shaft, and the shape of the inner peripheral surface of the other of the output shaft and the movable shaft. The inner peripheral surface engages with the outer peripheral surface. Due thereto, the stress, that is applied to the both of the output shaft and the movable shaft at the time when rotation is transmitted from the movable shaft to the output shaft, can be dispersed over an wide range of this outer peripheral surface and inner peripheral surface. Therefore, even if the output shaft, the movable shaft, and the output-side clutch member that is integral therewith are formed of resin, the strength that is needed in order to transmit rotational force can be ensured, and therefore, a lightening of the weight can be devised. Further, at the time of manufacturing the output shaft, the movable shaft and the output-side clutch member, metal working or the like is not needed, and therefore, the device can be manufactured inexpensively, and a lowering of cost also becomes possible.

In an output member of a second aspect, in the first aspect, the guide portion is structured from an outer-side engaging portion, that is convex and concave in cross-section and is formed along the axial direction at the outer peripheral surface of the one of the output shaft and the movable shaft, and an inner side engaging portion, that is convex and concave in cross-section and engages with the outer-side engaging portion so as to be slidable in the axial direction.

In the second aspect, the positioning of the movable shaft in the peripheral direction with respect to the output shaft is carried out precisely and with high accuracy, and a concentration of stress at the time of transmitting rotation from the movable shaft to the output shaft is prevented, and deterioration of the output member is prevented.

In an output member of a third aspect, in the first aspect, the one of the output shaft and the movable shaft is formed in a polygonal shape in cross-section, and an inner peripheral surface of the other of the output shaft and the movable shaft is formed in a polygonal shape in cross-section that engages with a polygonal outer peripheral surface of the one so as to be slidable in the axial direction, and the guide portion is structured by the polygonal outer peripheral surface of the one and the polygonal inner peripheral surface of the other.

In the third aspect, operation and effects that are similar to those of the above-described second aspect can be obtained.

In an output member of a fourth aspect, in any one aspect of the first through third aspects, the urging member is disposed at interiors of the output shaft and the movable shaft.

In the fourth aspect, due to the urging member being disposed at the interiors of the output shaft and the movable shaft, the output shaft and the movable shaft can be made to have larger diameters than conventional structures, without the entirety being made larger. Due thereto, the strengths of the output shaft and the movable shaft can be improved, even though they are made of resin.

In an output member of a fifth aspect, in the fourth aspect, an inner peripheral surface of the movable shaft and an outer peripheral surface of the output shaft are engaged, and a guide hole that opens toward a distal end side is formed in the output shaft, and a coil spring that serves as the urging member is accommodated in the guide hole, and a positioning portion, that positions an end portion of the coil spring, is provided at the movable shaft.

In the fifth aspect, the guide hole that opens at the distal end side is formed in the output shaft, and the coil spring, that is disposed at the interiors of the output shaft and the movable shaft, is accommodated in the guide hole. Due thereto, the length of the coil spring can be stretched to be longer by an amount corresponding to the depth of the guide hole, and therefore, the durability of the coil spring can be improved. Moreover, because the positioning portion, that positions the end portion of the coil spring, is provided at the movable shaft, at the time when the coil spring contracts accompanying the sliding of the movable shaft with respect to the output shaft, the distal end of the output shaft and the coil spring interfering with one another can be prevented or suppressed.

In an output member of a sixth aspect, in the fifth aspect, the positioning portion is a projection that is inserted in the end portion of the coil spring.

In the sixth aspect, the projection, that positions the coil spring at the movable shaft, is inserted in an end portion of the coil spring, and therefore, the coil spring buckling at the time of contracting can be suppressed by the projection. Accordingly, the distal end of the output shaft and the coil spring interfering with one another can be effectively prevented or suppressed.

In an output member of a seventh aspect, in any one aspect of the first through sixth aspects, the output-side clutch member is molded integrally with the movable shaft.

In the seventh aspect, because the output-side clutch member is molded integrally with the movable shaft, the assembly processes and number of parts can be reduced, and a further lowering of cost can be devised, and rattling does not arise between the both, and deterioration due to rattling is prevented. Further, by molding the movable shaft and the output-side clutch member integrally, there is no need whatsoever to design the both including suitable tolerance in consideration of the difference in thermal expansions, and, for this reason as well, lowering of costs is devised.

In an output member of an eighth aspect, in any one aspect of the first through seventh aspects, the output-side clutch member is an output-side bevel gear that, when the movable shaft slides in the one direction, is configured to mesh-together with an input-side bevel gear that serves as an input-side clutch member.

In the eighth aspect, the output-side bevel gear, that serves as the output-side clutch member, and the input-side bevel gear, that serves as the input-side clutch member, are configured to mesh with one another. Therefore, transmission of rotation can be carried out well as compared with a structure in which, for example, the input-side clutch member and the output-side clutch member are joined by frictional force.

A multi-shaft driving device of a ninth aspect comprises: a plurality of the output members whose respective output shafts are connected via transmitting members to a plurality of movable mechanisms provided at a vehicle; a plurality of input-side clutch members that are provided so as to correspond respectively and individually to the plurality of output members, and a selector member that connects the output-side clutch member of a selected output member among the plurality of output members to the corresponding input-side clutch member by making the movable shaft of the selected output member slides from a usual position toward an urging direction by the urging member or be pushed and slide against the urging member. When the movable shaft of the output member is slid in the one direction, the corresponding input-side clutch member connects with the output-side clutch member, and further, the input-side clutch member is transmitted drive power of a motor thereby rotating.

In the ninth aspect, the movable shaft of the output member that is selected from among the plural output members is, by the selector member, slid from the usual position toward the urging direction by the urging member, or is pushed and slid against the urging member. Due thereto, the output-side clutch member of the selected output member connects with the corresponding input-side clutch member. Thus, drive power of a motor is transmitted from the input-side clutch member to the output-side clutch member, and further, is transmitted to the output shaft via the guide portion from the movable shaft that is integral with the output-side clutch member, and the output shaft rotates. This rotation of the output shaft is transmitted via the transmitting member to the movable mechanism, and the movable mechanism operates. Here, because the plural output members are according to any one aspect of the first through eighth aspects, favorable operation and effects are obtained as described above.

Advantageous Effects of Invention

In accordance with the present invention, the effect is achieved that there are provided an output member and a multi-shaft driving device that devise a further lightening of weight and lowering of costs as compared with conventional structures.

BEST MODES FOR CARRYING OUT THE INVENTION

An embodiment of the present invention is described hereinafter with reference to the drawings.

(1) Structure of Multi-Shaft Driving Device

Figure 1:
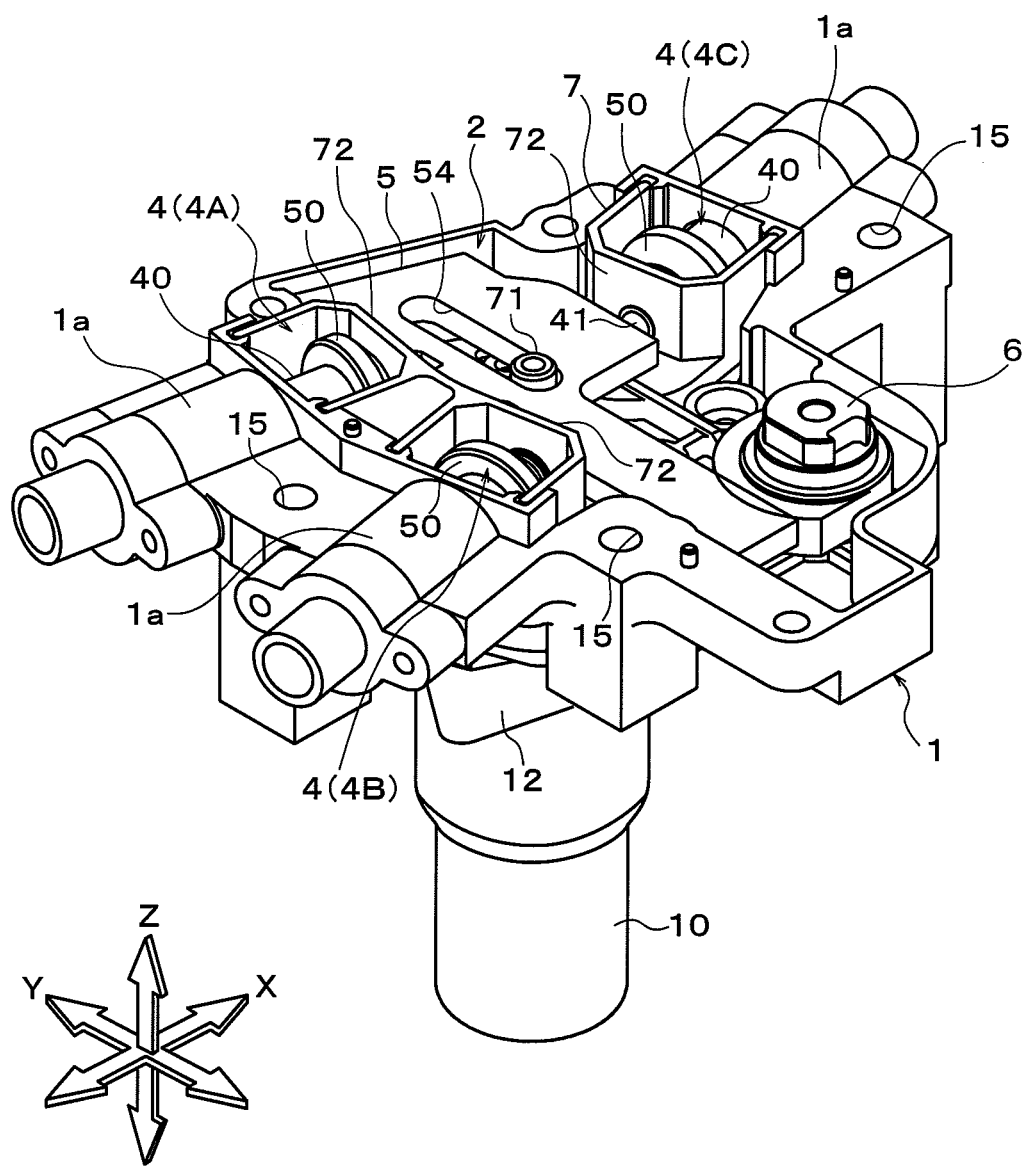
FIG. 1 is a perspective view showing a multi-shaft driving device relating to an embodiment of the present invention.

FIG. 1 is a perspective view showing a multi-shaft driving device relating to an exemplary embodiment. This multi-shaft driving device is a structure that selectively drives plural movable mechanisms of an unillustrated power seat for a vehicle by one motor. The movable mechanisms are, in this case, three mechanisms that are a lifter mechanism that adjusts a height of the seating surface of a seat, a reclining mechanism that adjusts an angle of a seatback, and a sliding mechanism that adjusts front-back position of the seat. These movable mechanisms operate due to driving shafts provided at respective mechanisms rotating forward and reversely.

Figure 2:
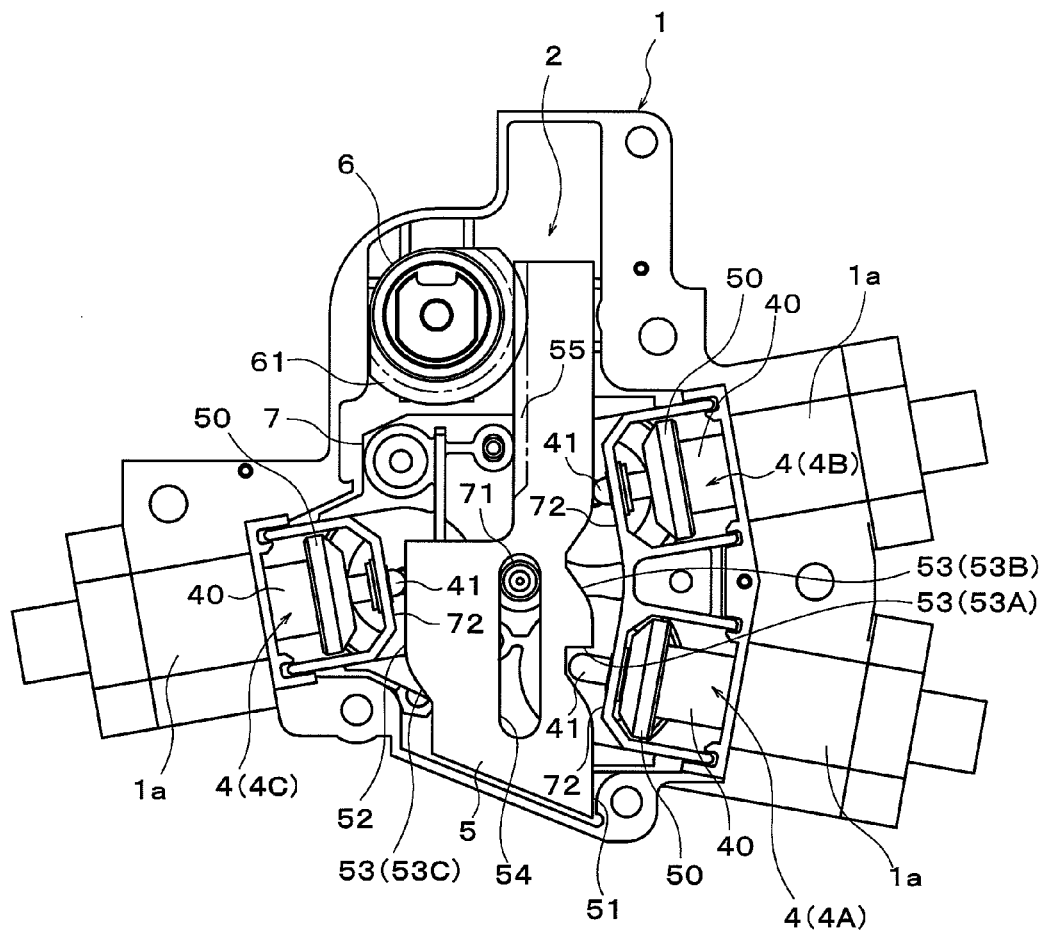
FIG. 2 is a plan view of the multi-shaft driving device.

Reference numeral 1 in FIG. 1 and FIG. 2 is a device case, and reference numeral 10 is a motor. The motor 10 has a rotating shaft 11 that projects-out upwardly, and is fixed to a reverse surface of the device case 1 via a bracket 12. A clutch unit 2 is housed in this device case 1. Note that the clutch unit 2 is a structure that is covered by an unillustrated cover that is mounted to the device case 1. Further, the device case 1 is fixed to a member, such as a seat frame or the like, by utilizing plural screw insertion holes 15.

Figure 3:
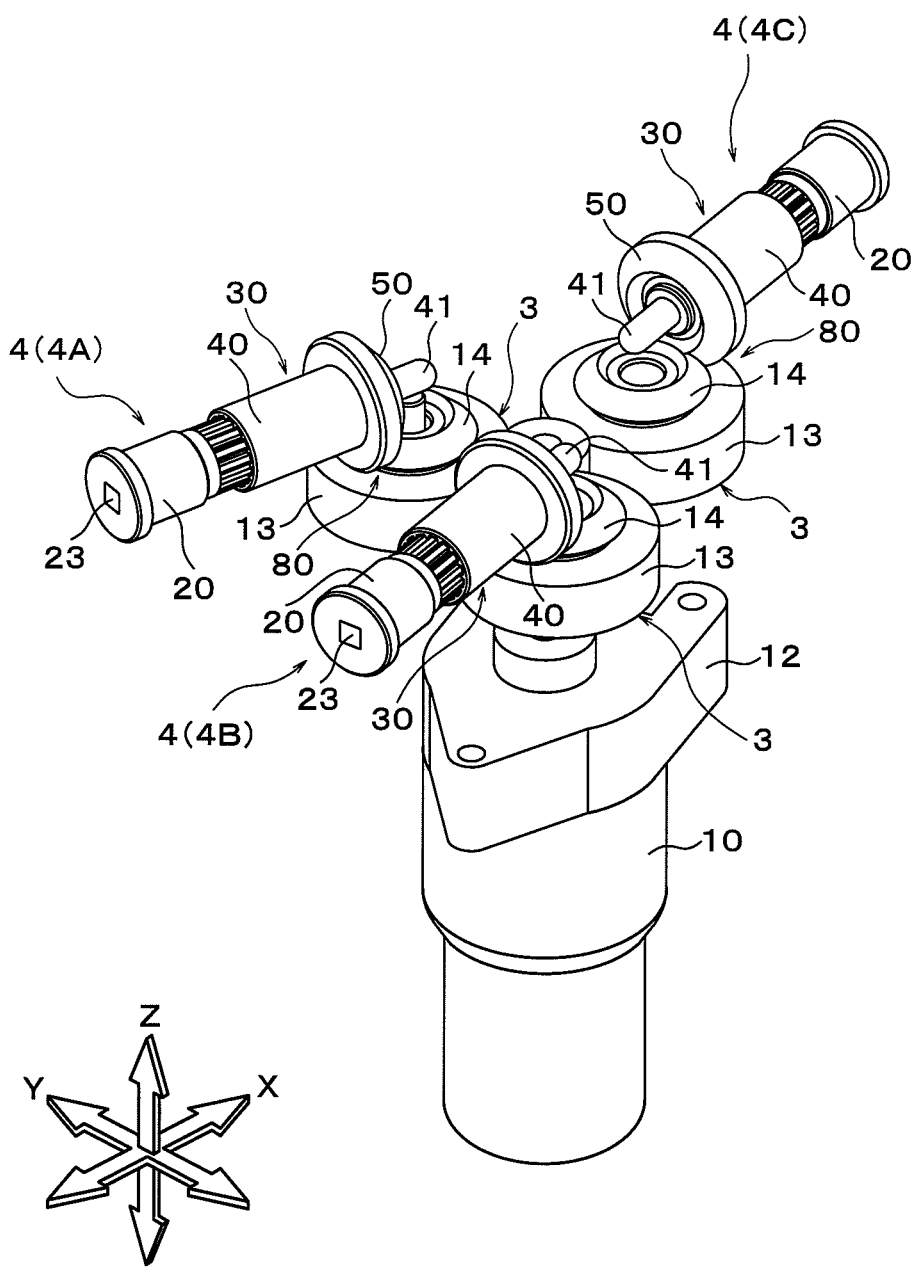
FIG. 3 is a perspective view showing the structure of main portions of the multi-shaft driving device.

As shown in FIG. 3, the clutch unit 2 has plural input members 3 that are provided per each of the above-described mechanisms and to which driving power of the motor 10 is transmitted, plural output members 4 having output shafts 20 that are connected to the respective mechanisms via unillustrated torque cables (transmission members), clutch mechanisms 80 that are provided at the respective input members 3 and outputs members 4 and that connect/disconnect transmission of driving power from the input members 3 to the respective output shafts 20, a selector member (switching means) 5 that selectively sets these clutch mechanisms 80 in a connected state, and an operation shaft 6 that operates the selector member 5. Note that FIG. 3 and FIG. 4 are views of states in which the device case 1 and gear holders 7 are removed.

Figure 4:
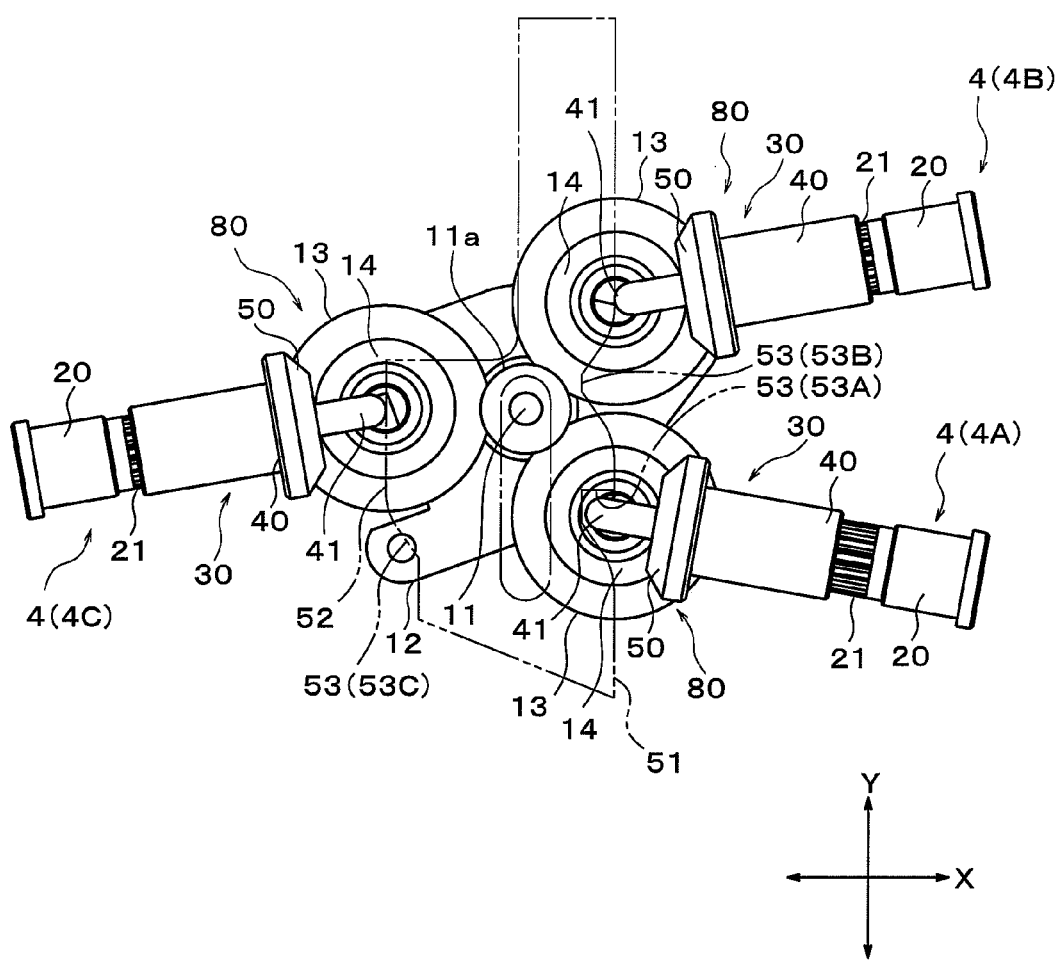
FIG. 4 is a plan view showing the structure of main portions of the multi-shaft driving device.

As shown in FIG. 4, the plural input members 3 have plural (in this case, three) input gears 13 that mesh-together with a pinion 11a that is fixed to the upper end of the rotating shaft 11. The input gears 13 are spur gears that have rotational axes parallel to the rotating shaft 11, and input-side bevel gears (input-side clutch members) 14 that are made of resin are fixed concentrically to the upper end surfaces of the input gears 13. These input gears 13 and input-side bevel gears 14 are supported so as to rotate freely at the device case 1, via unillustrated input shafts that are parallel to the rotating shaft 11 that runs along a Z direction. The driving power of the motor 10 is transmitted to the respective input gears 13, and, at the time of operation of the motor 10, the respective input-side bevel gears 14 are in states of always rotating.

Reference numeral 7 in FIG. 1 and FIG. 2 is the gear holder that is plate-shaped. This gear holder 7 is fixed at the interior of the device case 1 so as to cover the respective input members 3. A guide projection 71 that projects-out in the Z direction is formed at a predetermined place of this gear holder 7. Further, the aforementioned selector member 5 is a plate-shaped member that is long in a Y direction in FIG. 1 and FIG. 2. A guide hole 54, that extends in the Y direction and corresponds to the guide projection 71, is formed in this selector member 5, and the guide projection 71 is inserted in this guide hole 54. Due to the selector member 5 being guided by the guide projection 71, the selector member 5 is supported so as to slide freely in the Y direction on the gear holder 7.

Among the both side surfaces that run along the Y direction of the selector member 5, the side surface at the right side in FIG. 2 is made to be a first cam surface 51. Further, the lower side of the side surface at the left side is made to be a second cam surface 52, and a rack 55, at which a row of teeth is lined-up in the Y direction, is formed at the upper side. The aforementioned operation shaft 6 is supported so as to rotate freely within the device case 1 with the Z direction being the rotational axis thereof, and a pinion 61 that meshes-together with the rack 55 is formed at this operation shaft 6. An operation member, such as an unillustrated dial or lever or the like that is disposed at the outer side of the cover 13, is fixed to the operation shaft 6. When the operation shaft 6 is rotated via this operation member, due to rotation of the pinion 61, the selector member 5 is sent reciprocally in the Y direction via the rack 55 and in accordance with the rotating direction of the operation shaft 6.

The ON/OFF and the rotating direction of the motor 10 are selected by unillustrated switches. When the motor 10 is operating, all of the input members 3 rotate. Note that it is preferable to provide the switches at the aforementioned operation member. This is because operation of the clutch unit 2, i.e., the selection of the movable mechanism and the ON/OFF of the motor 10, can be carried out by a series of operations.

As shown in FIG. 4, the plural output members 4 are disposed so as to face the respective cam surfaces 51, 52 at the both sides, in the X direction, of the selector member 5. In this case, the two output members 4 (a first output member 4A and a second output member 4B) are disposed with respect to the first cam surface 51 so as to be apart in the Y direction, and the one output member 4 (a third output member 4C) is disposed with respect to the second cam surface 52. The plural output members 4 have the output shafts 20. The plural output members 4 are housed in the device case 1 in a state in which thrusting directions of the output shafts 20 are parallel to the X-Y plane, that is orthogonal to the Z direction, and are inclined by predetermined angles with respect to the cam surfaces 51, 52.

Figure 5A:
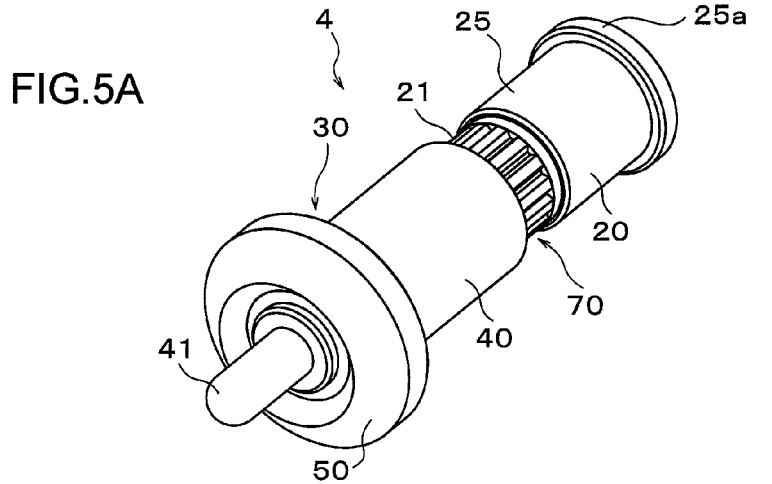
FIG. 5A is a perspective view of an output member of the multi-shaft driving device.
Figure 5B:
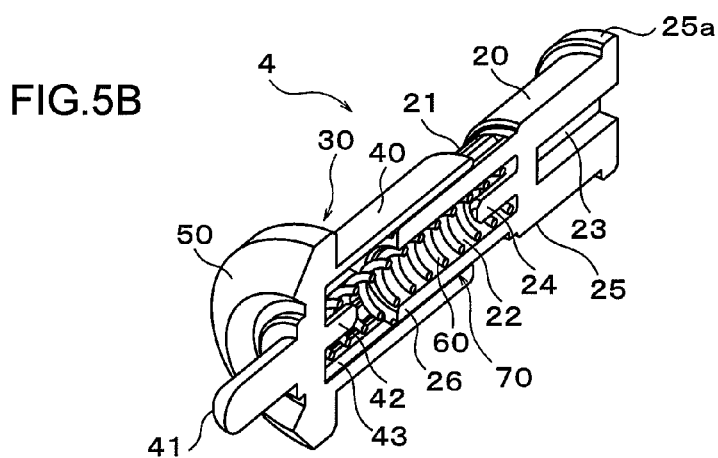
FIG. 5B is a vertically-divided perspective view of the output member of the multi-shaft driving device.
Figure 5C:
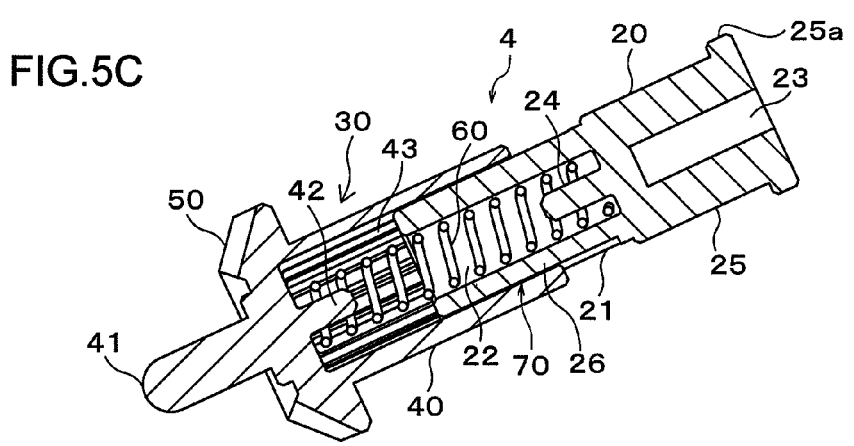
FIG. 5C is a vertically-divided sectional view showing the structure of an output member of the multi-shaft driving device.

As shown in FIGS. 5B and 5C, each of the output shafts 20 is a shaft at which a cylindrical tube portion 26 is formed at the distal end side of a large diameter portion 25, and is disposed at a given distance from the selector member 5. A flange 25a is formed at the rear end of the large diameter portion 25. At each of the output shafts 20, the large diameter portion 25 is supported via an unillustrated bearing bush within a bearing holder portion 1a that is cylindrical tube shaped and is formed at the device case 1, in a state of rotating freely and being unable to move in the thrusting direction. The respective output shafts 20 are connected via unillustrated torque cables (transmitting members) to movable mechanisms of a power seat for a vehicle such as, a mechanism that adjusts the height of the seating surface of the seat, a reclining mechanism that adjusts the angle of the seatback, a mechanism that adjusts the front-back position of the seat, and the like.

A drive power transmitting mechanism 30, that transmits the rotation of the input-side bevel gear 14 on the corresponding input gear 13 to the output shaft 20, is provided at the distal end side (the selector member 5 side) of the output shaft 20. As shown in FIG. 5, the drive power transmitting mechanism 30 is structured with a movable shaft 40, an output-side bevel gear (output-side clutch member) 50, and a coil spring (urging member) 60. The movable shaft 40 is exteriorly placed on an outer peripheral side of the output shaft 20 so as to be able to advance and withdraw toward the selector member 5. This movable shaft 40 is exteriorly placed on the output shaft 20 in a state of being able to slide in axial direction of the output shaft 20 and being unable to rotate relatively, due to a guide portion 70.

The guide portion 70 in this example is structured by an outer-side engaging portion 21, that is convex and concave shaped in cross-section and is formed at the outer peripheral surface of the output shaft 20, and an inner-side engaging portion 43, that is convex and concave shaped in cross-section and engages with the outer-side engaging portion 21 so as to be slidable in the axial direction. In this example, the respective engaging portions 21, 43 are structured by so-called splines at which numerous grooves and protrusions, that are rectangular in cross-section and engage with one another, are formed alternately.

The output-side bevel gear 50, that can mesh-together with the input-side bevel gear 14, is molded integrally and concentrically with a distal end portion of the movable shaft 40. The output-side bevel gear 50, together with the input-side bevel gear 14, structures the clutch mechanism 80. A convex portion 41 that projects-out toward the distal end side is formed at the distal end of the movable shaft 40 and at the center of the output-side bevel gear 50. A guide hole 22 that opens toward the distal end side is formed at the axial center of the output shaft 20. The coil spring 60, that urges such that the movable shaft 40 advances toward the selector member 5 side, is accommodated in this guide hole 22. Projections 24 and 42, that are inserted in the end portions of the coil spring 60 and position the coil spring 60, are respectively formed at the interiors of the output shaft 20 and the movable shaft 40. Further, an installation hole 23, that is rectangular in cross-section, is formed in the rear end surface of the output shaft 20, and one end portion of the aforementioned torque cable is installed in this installation hole 23. The torque cable rotates together with the output shaft 20.

The coil spring 60 is accommodated in a compressed state in the interiors of the cylindrical tube portion 26 of the output shaft 20 and the movable shaft 40. The output-side bevel gear 50 is urged toward the selector member 5 (one direction in the axial direction of the movable shaft 40) by this coil spring 60, and the distal end of the convex portion 41 runs into the cam surface 51, 52. The distal end surface of the convex portion 41 is formed in a spherical shape, and slidingly-contacts the cam surface 51, 52 to which the distal end of the convex portion 41 runs into, when the selector member 5 is sent in the Y direction.

As shown in FIG. 2 and FIG. 4, concave portions 53 (a first concave portion 53A and a second concave portion 53B), that correspond to the first output member 4A and the second output member 4B, are formed in the first cam surface 51 of the selector member 5. The concave portion 53 (a third concave portion 53C), that corresponds to the third output member 4C, is formed in the second cam surface 52. When the selector member 5 is sent in the Y direction, the convex portion 41 of any one of the output members 4 fits into the concave portion 53.

Due to the convex portion 41 fitting into the concave portion 53 in this way, the entire output-side bevel gear 50 slides in the direction toward the selector member 5 and, at this time, the output-side bevel gear 50 engages and meshes-together with the input-side bevel gear 14, and the clutch mechanism 80 enters into a connected state. The convex portion 41 of the output-side bevel gear 50 passes through an unillustrated through-hole that is formed in a wall portion 72 (see FIG. 1 and FIG. 2) that is formed in the above-described gear holder 7. An unillustrated bearing bush is press-fit into and fixed in this through-hole, and the convex portion 41 is supported so as to freely slidingly rotate within this bearing bush and freely move in the thrusting direction. At the time of connection of the clutch mechanism 80, a distal end surface of the output-side bevel gear 50 abuts the wall portion 72, and, due thereto, the stroke end at the time when the output-side bevel gear 50 advances is restricted.

At the time of connection of the clutch mechanism 80, when the motor 10 operates and the input member 3 rotates, the rotation thereof is transmitted from the input-side bevel gear 14 to the output-side bevel gear 50, and the output-side bevel gear 50 rotates, and the rotation of the movable shaft 40 is transmitted to the output shaft 20, and the output shaft 20 rotates. Further, in the state in which the convex portion 41 has run into the cam surface 51 (52) without fitting into the concave portion 53, the output-side bevel gear 50 is pushed by the cam surface 51 (52) toward the output shaft 20 side against the coil spring 60. At this time, the output-side bevel gear 50 is apart from the input-side bevel gear 14, and the clutch mechanism 80 is in a disconnected state.

Figure 6:
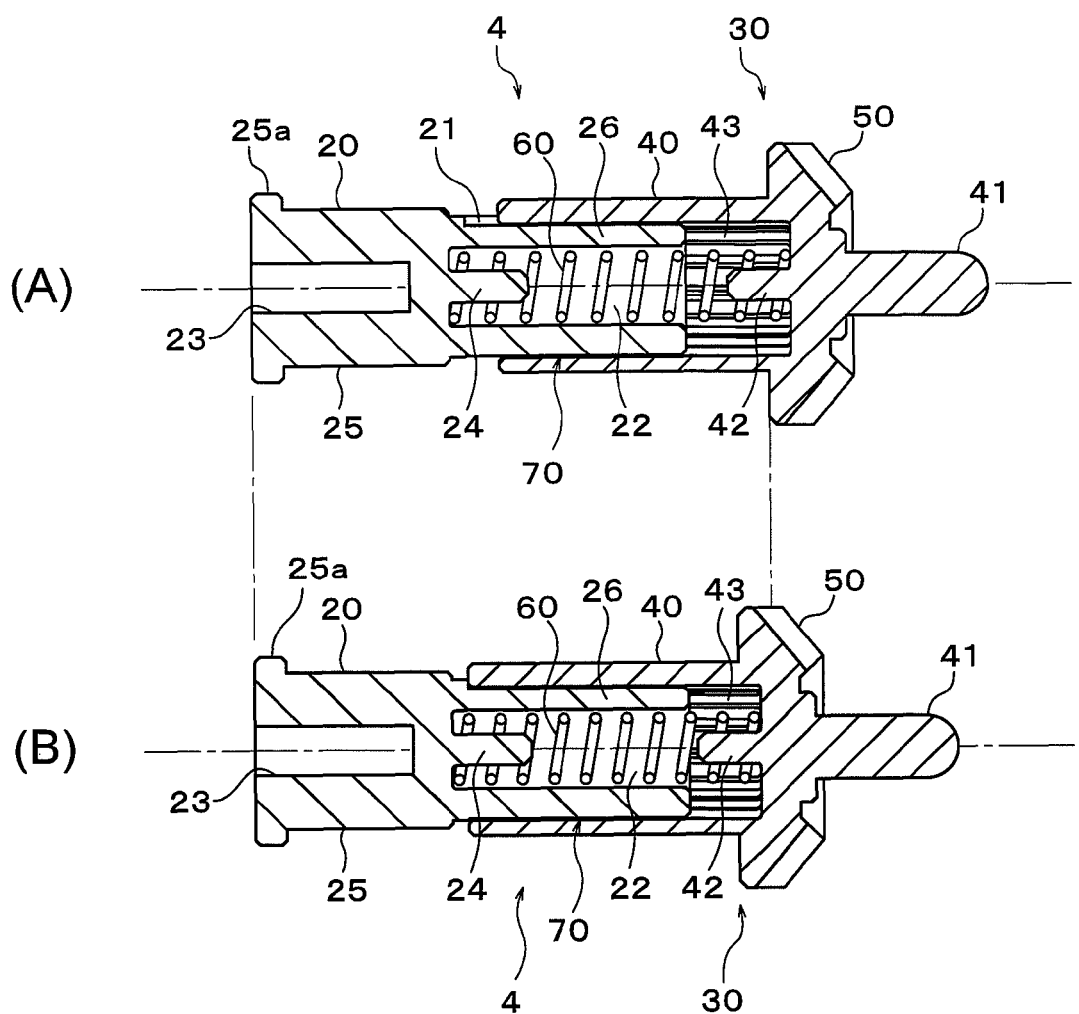
FIG. 6 is a vertically-divided sectional view showing a state of a movable shaft and an output-side bevel gear of the output member, and (A) indicates a state in which a movable shaft and an output-side bevel gear of the output member are positioned at a clutch disconnecting position with respect to an output shaft, (B) indicates a state in which the movable shaft and the output-side bevel gear have stroked to the maximum limit in another direction with respect to the output shaft.

Note that a state in which the output-side bevel gear 50 and the movable shaft 40 are disposed at clutch disconnecting positions with respect to the output shaft 20 is shown in FIG. 6(A). In this state, the coil spring 60 is compressed by a predetermined amount from the state shown in FIG. 5(C), but, due to the projection 42 being inserted in the end portion of the coil spring 60, buckling of the coil spring 60 is prevented. Further, a state in which the output-side bevel gear 50 and the movable shaft 40 have stroked to the maximum limit in the opposite direction of the aforementioned one direction with respect to the output shaft 20 is shown in FIG. 6(B). The opposite direction is the other direction opposite from the urging direction of the coil spring 60. The coil spring 60 is structured such that, at the time when the output member 4 is assembled to the device case 1 and the gear holder 7, the coil spring 60 is compressed up to this state shown in FIG. 6(B), but, thereafter, the coil spring 60 is not compressed more than the state shown in FIG. 6(A). Due thereto, the durability of the coil spring 60 is improved.

Here, in the present embodiment, the above-described output shaft 20, and the movable shaft 40 at which the output-side bevel gear 50 is molded integrally, are both molded by using resins as the materials thereof. The appropriate types of resins are selected, and, for example, PBT (polybutylene terephthalate) that is effective from the standpoint of strength, or the like, is suitably used for the output shaft 20. Further, POM: polyacetal resin (polyoxymethylene) that is effective from the standpoint of slidability, or the like, is suitably used for the movable shaft 40 that includes the output-side bevel gear 50, as well as for the input-side bevel gear 14.

(2) Operation of Multi-Shaft Driving Device

Operation of the above-described multi-shaft driving device is described next.

The movable shaft 40 of the drive power transmitting portion 30 is urged toward the selector member 5 side by the coil spring 60. Due to the selector member 5 moving reciprocally in the Y direction accompanying rotation of the operation shaft 6, the convex portion 41 at the distal end slides reciprocally, with respect to the output shaft 20, between two positions that are a clutch disconnecting position and a clutch connecting position. At the clutch disconnecting position, the convex portion 41 abuts the cam surface 51 (52) of the selector member 5 and at the clutch connecting position, the convex portion 41 has entered into the concave portion 53. As the selector member 5 is moved, the convex portion 41 of the movable shaft 40 that is at the clutch disconnecting position enters into the concave portion 53 via the inclined surface and advances to the clutch connecting position. Then, when the selector member 5 moves further from this state, the convex portion 41 abuts the cam surface 51 (52) via the inclined surface.

At the clutch disconnecting position, due to the cam surface 51 (52) of the selector member 5 pushing the convex portion 41 against the coil spring 60, such as the driving power transmitting portion 30 at the left side and the upper right side of FIG. 4, the movable shaft 40 contracts and withdraws toward the output shaft 20 side. Due thereto, the output-side bevel gear 50 moves apart from the input-side bevel gear 14, and the clutch mechanism 80 enters into a disconnected state. When the clutch mechanism 80 is in the disconnected state, the input gear 13, that is rotating due to the motor 10 operating, rotates idly, and the drive power of the motor 10 is not transmitted to the output-side bevel gear 50, and the output shaft 20 does not rotate. Accordingly, the torque cable does not operate.

Next, when the operation shaft 6 is rotated and the selector member 5 is moved, the concave portion 53 faces the convex portion 41 of the movable shaft 40. At this time, the convex portion 41 enters into the concave portion 53 via the inclined surface, and the movable shaft 40 advances to the clutch connecting position. Thereupon, the output-side bevel gear 50 meshes-together with the input-side bevel gear 14, and the clutch mechanism 80 enters into a connected state. When the clutch mechanism 80 is connected, rotation of the motor 10 is transmitted to the output-side bevel gear 50 via the input-side bevel gear 14 that is fixed to the input gear 13, and is further transmitted to the output shaft 20 via the guide portion 70 from the movable shaft 40 that is integral with the output-side bevel gear 50, and the output shaft 20 rotates. Then, the torque cable, rotates and operates.

The above is the operation of the multi-shaft driving device. By rotating the operation shaft 6 via the operation member and causing the concave portion 53 of the selector member 5 to face the drive power transmitting portion 30 of the output shaft 20 that it is desired to operate, that output shaft 20 can be operated, and, due thereto, the above-described respective movable mechanisms of the power seat for a vehicle are driven selectively. The switch that turns the motor 10 ON/OFF may be disposed separately, but, when this switch is provided at the above-described operation member, the operation of the motor 10 and operation of the output shaft 20 can be carried out smoothly by a series of operations in continuation with the selecting of the output shaft 20 that is to be operated, and therefore, this is preferable.

(3) Effects of Present Embodiment

In accordance with the multi-shaft driving device of the present embodiment, the guide portion 70 of the output member 4 is structured by the shape of the outer peripheral surface of the output shaft 20 and the shape of the inner peripheral surface of the movable shaft 40 that engages with this outer peripheral surface. Due thereto, the stress, that is applied to the output shaft 20 and the movable shaft 40 at the time when rotation is transmitted from the movable shaft 40 to the output shaft 20, can be dispersed over the wide range of the outer peripheral surface of the output shaft 20 and the inner peripheral surface of the movable shaft 40. Therefore, even though the output shaft 20, the movable shaft 40 and the output-side clutch member 50 that is integral therewith are made of resin, the strength needed in order to transmit the drive power (rotational force) of the motor can be ensured, and therefore, the effect of devising lightening of weight is exhibited. Further, because metal working and the like are not needed, the device can be manufactured inexpensively, and a lowering of cost also becomes possible.

Further, in the present embodiment, the movable shaft 40 is exteriorly placed on the output shaft 20 slidably via the guide portion 70 that is formed from a spline. Therefore, the positioning of the movable shaft 40 in the peripheral direction with respect to the output shaft 20 is carried out precisely and with high accuracy, and there are also the advantages that a concentration of stress at the time of transmitting rotation from the movable shaft 40 to the output shaft 20 is prevented, and deterioration is prevented.

Moreover, in the present embodiment, by exteriorly placing the movable shaft 40, at which the output-side bevel gear 50 is provided, on the outer peripheral side of the output shaft 20, and disposing the coil spring 60 at the interior of the movable shaft 40 and the interior of the output shaft 20, the movable shaft 40 can be made to have a larger diameter than in conventional structures without making the whole to be larger, and therefore, the output member 4 can be made to have the needed strength even while being made of resin. Namely, strength can also be ensured even while a lightening of the weight is made possible for the output member 4.

Further, in the present embodiment, the guide hole 22, that opens toward the distal end side, is formed in the output shaft 20, and the coil spring 60, that is disposed at the interiors of the output shaft 20 and the movable shaft 40, is accommodated in the guide hole 22. Due thereto, the length of the coil spring 60 can be stretched to be longer by an amount corresponding to the depth of the guide hole 22, and therefore, the durability of the coil spring 60 can be improved. Moreover, because the projection 42, that positions the end portion of the coil spring 60, is provided at the movable shaft 40, at the time when the coil spring 60 contracts accompanying the sliding of the movable shaft 40 with respect to the output shaft 20, the distal end of the output shaft 20 and the coil spring 60 interfering with one another can be prevented or suppressed.

Further, in the present embodiment, the projection 42, that positions the coil spring 60 at the movable shaft 40, is inserted into the end portion of the coil spring 60, and therefore, the coil spring 60 buckling at the time of contracting can be suppressed by the projection 42. Accordingly, the distal end of the output shaft 20 and the coil spring 60 interfering with one another can be effectively prevented or suppressed.

Moreover, in the present embodiment, the output-side bevel gear 50 and the movable shaft 40 are molded integrally. Therefore, the assembly processes and number of parts are reduced, and a further lowering of cost can be devised, and rattling does not arise between the both, and deterioration due to rattling is prevented. Further, by molding the movable shaft 40 and the output-side bevel gear 50 integrally, there is no need whatsoever to make the both be designs that include suitable tolerance in consideration of the difference in thermal expansions, and, for this reason as well, lowering of costs is devised.

Further, in the present embodiment, the input-side bevel gear 14, that serves as an input-side clutch member, and the output-side bevel gear 50, that serves as an output-side clutch member, mesh with one another. Therefore, the transmitting of rotation can be carried out well as compared with, for example, a structure in which the input-side clutch member and the output-side clutch member are joined by frictional force.

(4) Other Forms of Guide Portion

Figure 7A:
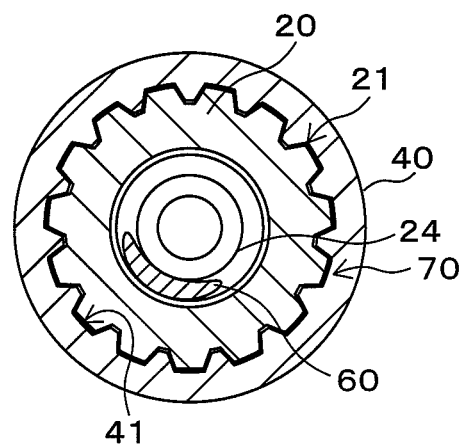
FIG. 7A is a cross-sectional view showing a guide portion of the output member.

As the guide portion 70 that exteriorly places the movable shaft 40 on the outer peripheral side of the output shaft 20 so as to be slidable in the axial direction of the output shaft 20 and so as to be unable to rotate relatively, a form in which there are numerous engaging portions in the peripheral direction and that disperses stress as much as possible, such as the spline shown in FIG. 7A, is preferable. Other forms of the guide portion having such a function are shown in FIGS. 7B through 7D.

Figure 7B:
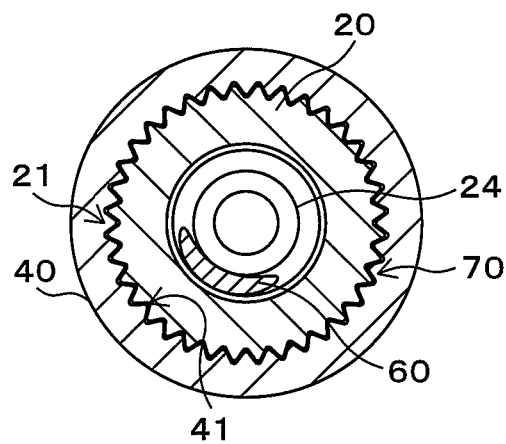
FIGS. 7B through 7D are cross-sectional views showing examples of other forms of the guide portion.

The outer-side engaging portion 21, that is convex and concave in cross-section, that is formed at the outer peripheral surface of the output shaft 20, and that structures the guide portion 70 of FIG. 7B, is structured by numerous grooves and projections that are triangular in cross-section. The inner-side engaging portion 43, that is formed at the inner peripheral surface of the movable shaft 40 and that structures the guide portion 70, is structured from numerous grooves and projections that are triangular in cross-section and that engage with the outer-side engaging portion 21 so as to be slidable in the axial direction.

Figure 7C:
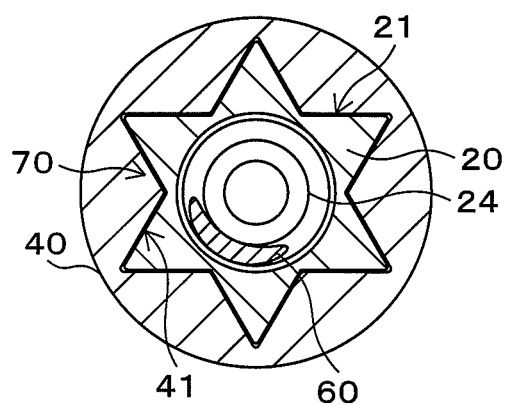

Further, in FIG. 7C, the cross-sectional shape of the output shaft 20 is star-shaped, and the outer-side engaging portion 21 is structured by plural (six in this case) grooves and projections that are triangular in cross-section. Further, the inner-side engaging portion 43, that is star-shaped in cross-section, that is formed from grooves and projections that are triangular in cross-section, and that engage with this outer-side engaging portion 21 so as to be slidable in the axial direction, is formed at the inner peripheral surface of the movable shaft 40. The guide portion 70 in this case is structured from this outer-side engaging portion 21 and inner-side engaging portion 43.

Figure 7D:
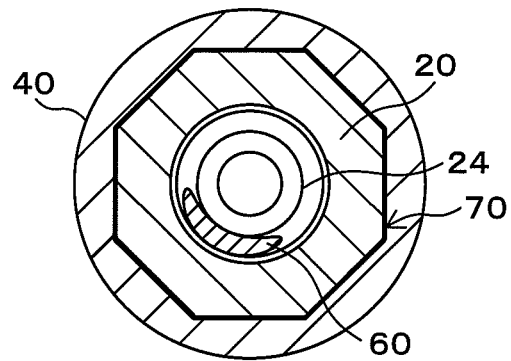

Further, in FIG. 7D, the output shaft 20 is formed in a polygonal shape in cross-section (here, a octagonal shape), and the inner peripheral surface of the movable shaft 40 is formed in a polygonal shape in cross-section that engages with the polygonal outer peripheral surface of the output shaft 20 so as to be slidable in the axial direction. In this case, the guide portion 70 is structured from the polygonal outer peripheral surface of the output shaft 20 and the polygonal inner peripheral surface of the movable shaft 40.

FIGS. 7A through 7D is examples of forms relating to the guide portion of the present invention, and, in addition to these, various forms such as, for example, the shape of the outer edge of the cross-section of the output shaft being wave-shaped and the cross-sectional shape of the inner peripheral surface of the movable shaft being a wave shape that slidably engages with the wave-shaped cross-section of the output shaft, and the like, can be considered as the guide portion.

(5) Supplemental Description of Embodiment

Note that the above-described embodiment is structured such that the input-side bevel gear 14 and the output-side bevel gear 50 are applied as the input-side clutch member and the output-side clutch member. However, the present invention is not limited to this, and the structures of the input-side clutch member and the output-side clutch member can be changed appropriately.

Further, the above-described embodiment is structured such that the output-side bevel gear 50, that serves as the output-side clutch member, is molded integrally with the movable shaft 40. However, the present invention is not limited to this and may be structured such that the output-side clutch member is molded as a body separate from the movable shaft and is fixed integrally to the movable shaft by heat welding or the like.

Further, the above-described embodiment is structured such that the output shaft 20 has the projection 24, but the present invention is not limited to this and may be a structure in which the projection 24 is omitted. In this case as well, the coil spring 60 can be positioned by the cylindrical tube portion 26 of the output shaft 20.

Further, the above-described embodiment is structured such that the movable shaft 40 has the projection 42 that serves as a positioning portion. However, the present invention is not limited to this, and, instead of the projection 42, an annular groove with which the end portion of the coil spring 60 fits-together may be formed in the movable shaft 40, and this may be made to be the positioning portion. Further, there may be a structure in which the positioning portion is omitted.

Further, the above-described embodiment is structured such that the coil spring 60 that serves as the urging member is accommodated in the guide hole 22 of the output shaft 20. However, the present invention is not limited to this, and may be a structure in which the guide hole 22 is omitted. Further, an urging member other than a coil spring may be applied.

Moreover, the above-described embodiment is structured such that the coil spring 60 that serves as the urging member is disposed at the interiors of the output shaft 20 and the movable shaft 40, but the present invention is not limited to this and may be structured such that the urging member is disposed at the exterior of the output shaft and the movable shaft.

Figure 8:
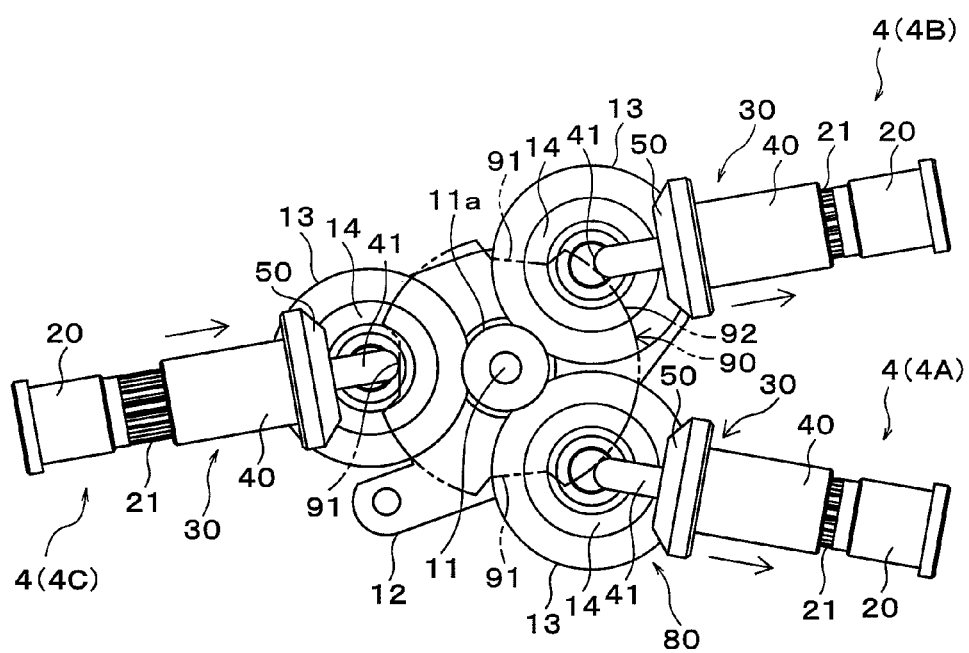
FIG. 8 is a plan view that corresponds to FIG. 3 and shows an example of another form of a selector member.

Further, the above-described embodiment is structured such that the selector member 5 is slid accompanying the rotation of the operation shaft 6. However, the present invention is not limited to this, and the structure of the selector member can be changed appropriately. For example, as shown in FIG. 8, there may be a structure in which a dial cam 90 that is disc-shaped is made to be the selector member. This dial cam 90 is disposed concentrically with the rotating shaft 11, and is supported so as to rotate freely with the center as the axis. Plural concave portions 91 are formed at predetermined places of the peripheral surface of the dial cam 90. The both end portions at the peripheral direction sides of these concave portions 91 are formed as inclined surfaces that are continuous with the peripheral surface.

At this dial cam 90, the clutch mechanism 80 is disconnected due to an outer peripheral surface 92 pushing the movable shaft 40, and the clutch mechanism 80 is connected due to the convex portion 41 of the movable shaft 40 entering-in and advancing into the concave portion 91 of the dial cam 90. Note that a structure that is operationally opposite to that described above may be used in accordance with, for example, the placement of the input-side bevel gear 14 and the output-side bevel gear 50, or the like. Namely, there can be a structure in which the clutch mechanism 80 is connected at the time when the outer peripheral surface 92 of the dial cam 90 is pushing the movable shaft 40, and the clutch mechanism 80 is disconnected when the convex portion 41 of the movable shaft 40 enters-in and advances into the concave portion 91 of the dial cam 90. Similar opposite operation is applicable for connection/disconnection of the clutch mechanism 80 with the selector member 5 relating to the above-described embodiment.

Further, the above-described embodiment is structured such that the outer peripheral surface of the output shaft 20 and the inner peripheral surface of the movable shaft 40 engage. However, the present invention is not limited to this, and may be structured such that an outer peripheral surface of a movable shaft 40' and an inner peripheral surface of an output shaft 20' engage (a structure in which the movable shaft is interiorly placed within the output shaft), such as an output member 4' shown in FIGS. 9A to 9C.

Regarding this output member 4', at the output shaft 20', an outer diameter of a large diameter portion 25 and an outer diameter of a cylindrical tube portion 26' are formed to be the same diameter, and the cylindrical tube portion 26' is formed to have a larger diameter than in the above-described embodiment. Further, the movable shaft 40' is formed to have a smaller diameter than in the above-described embodiment, and is inserted-in an inner side of the cylindrical tube portion 26'. An inner-side engaging portion 21', that is convex and concave in cross-section, is formed at an inner peripheral surface of the output shaft 20'. An outer-side engaging portion 43' that is convex and concave in cross-section is formed at an outer peripheral surface of the movable shaft 40'. The outer-side engaging portion 43' is engaged with the inner-side engaging portion 21' so as to be slidable in the axial direction. The respective engaging portions 21' 43' structure a guide portion 70'. Due to the guide portion 70', the movable shaft 40' is interiorly placed within the output shaft 20' in a state of being able to slide in the axial direction of the output shaft 20' and being unable to rotate relatively. Note that an annular groove 56 is formed in an output-side bevel gear 50' that is integral with the movable shaft 40', at a region that faces the distal end of the cylindrical tube portion 26'. Due to the distal end side of the cylindrical tube portion 26' being inserted into this groove 56, axial direction movement of the movable shaft 40' with respect to the output shaft 20' is permitted.

Further, the coil spring 60 is accommodated in a compressed state at the interiors of the output shaft 20' and the movable shaft 40'. The outer diameter of this coil spring 60 is set to be slightly smaller than the inner diameter of the movable shaft 40', and radial direction displacement of the coil spring 60 with respect to the movable shaft 40' is restricted. Further, the projection 24 that is formed at the output shaft 20' is inserted in the end portion of the coil spring 60. Due thereto, the coil spring 60 is positioned at the output shaft 20'.

Figure 9:
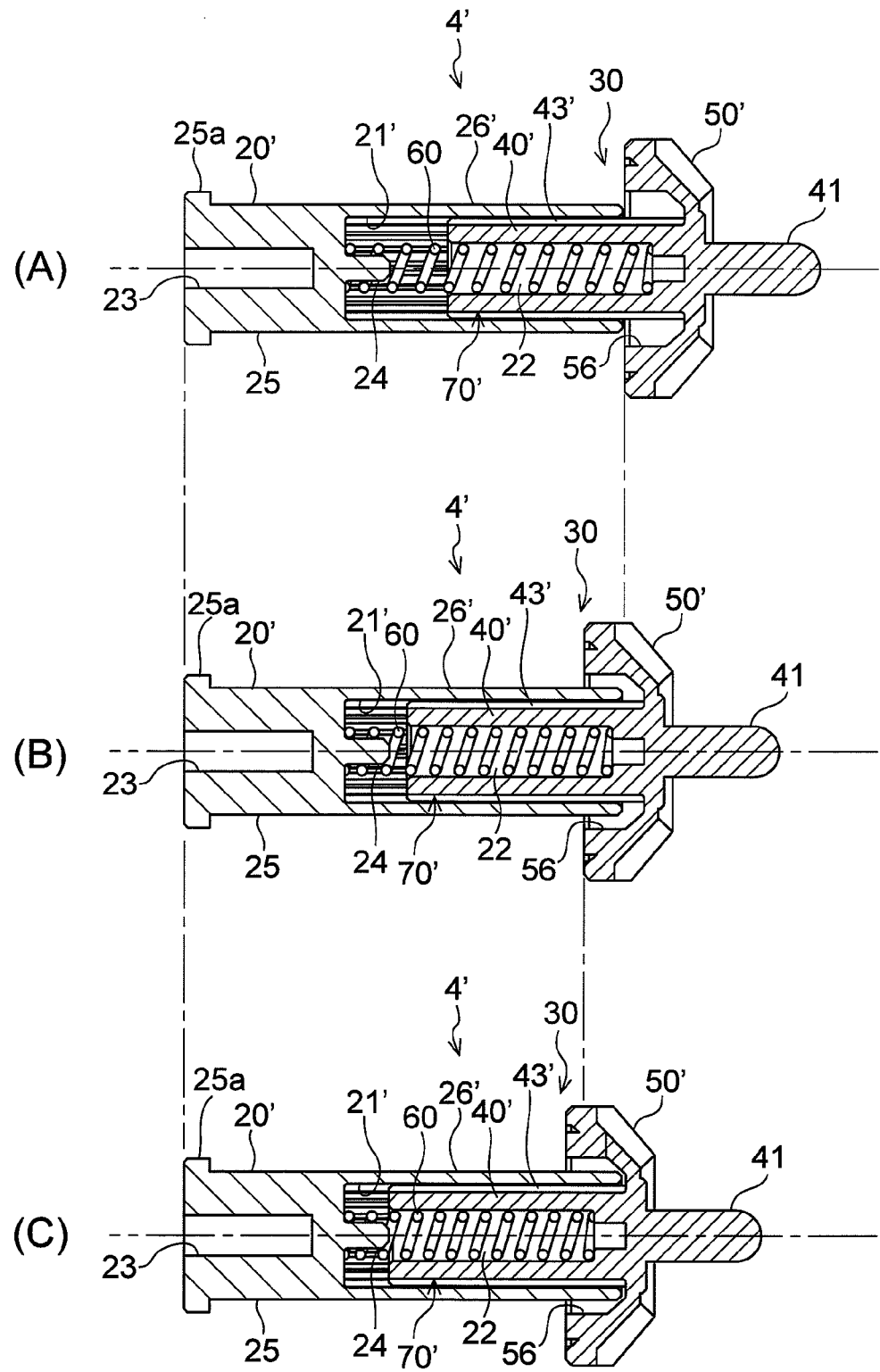
FIG. 9 shows examples of another form of the output member, and (A) is a vertically-divided sectional view showing a state in which a movable shaft and an output-side bevel gear are positioned at a clutch connecting position with respect to an output shaft, (B) is a vertically-divided sectional view showing a state in which the movable shaft and the output-side bevel gear are positioned at a clutch disconnecting position with respect to the output shaft, and (C) is a vertically-divided sectional view showing a state in which the movable shaft and the output-side bevel gear have stroked to the maximum limit in an opposite direction with respect to the output shaft.

This output member 4' as well exhibits operation and effects that are basically similar to those of the output member 4 relating to the above-described embodiment. Note that FIG. 9(A) shows a state in which the movable shaft 40' and the output-side bevel gear 50' are positioned at a clutch connecting position with respect to the output shaft 20', and FIG. 9(B) shows a state in which the movable shaft 40' and the output-side bevel gear 50' are positioned at a clutch disconnecting position with respect to the output shaft 20', and FIG. 9(C) shows a state in which the movable shaft 40' and the output-side bevel gear 50' have stroked to the maximum limit in the other direction (the direction of resisting the coil spring 60) with respect to the output shaft 20'. In the same way as in the above-described embodiment, the coil spring 60 is compressed up to the state shown in this FIG. 9(C) at the time when the output member 4' is assembled to the device case 1 and the gear holder 7.

Further, the multi-shaft driving device of the above-described embodiment is suitable as, for example, a driving device at the time of operating a power seat of a vehicle by the motor 10. Namely, the multi-shaft driving device may be connected, via the torque cables that are connected to the respective output shafts 20, to movable mechanisms of a power seat for a vehicle such as, for example, a mechanism that adjusts the height of the seating surface of the seat, a reclining mechanism that adjusts the angle of the seatback (seatback portion), a mechanism that adjusts the front-back position of the seat, and the like. And the drive power of the motor 10 may be selectively branched-off to the respective movable mechanisms and this movable mechanism can be operated. However, the multi-shaft driving device of the present invention is not limited to such a power seat, and can be applied to a mechanical device in which plural movable mechanisms are driven selectively.

What is claimed is:

1. An output member comprising:
    an output shaft that is made of resin and that is applied to a mechanical device for a vehicle;
    a movable shaft that is made of resin and is installed at the output shaft;
    an output-side clutch member that is made of resin and is provided integrally with the movable shaft;
    a guide portion that is structured by a shape of an outer peripheral surface of one of the output shaft and the movable shaft and a shape of an inner peripheral surface of another of the output shaft and the movable shaft, and that makes the movable shaft able to slide in an axial direction and unable to rotate relatively, with respect to the output shaft, wherein the inner peripheral surface of the other engages with the outer peripheral surface of the one of the output shaft and the movable shaft; and
    an urging member that urges the movable shaft in one direction or another direction opposite to the one direction in the axial direction,
    wherein the urging member is disposed at interiors of the output shaft and the movable shaft,
    a guide hole that opens toward a distal end side is formed in the output shaft, and a coil spring that serves as the urging member is accommodated in the guide hole, and a positioning portion, that positions an end portion of the coil spring, is provided at the movable shaft, and
    the output-side clutch member is an output-side bevel gear that, when the movable shaft slides in the one direction, is configured to mesh-together with an input-side bevel gear that serves as an input-side clutch member.

2. The output member of claim 1, wherein the guide portion is structured from an outer-side engaging portion, that is convex and concave in cross-section and is formed along the axial direction at the outer peripheral surface of the one of the output shaft and the movable shaft, and an inner side engaging portion, that is convex and concave in cross-section, is formed at the inner peripheral surface of the other of the output shaft and the movable shaft, and engages with the outer-side engaging portion so as to be slidable in the axial direction.

3. The output member of claim 1 wherein:
    the one of the output shaft and the movable shaft is formed in a polygonal shape in cross-section, and an inner peripheral surface of the other of the output shaft and the movable shaft is formed in a polygonal shape in cross-section that engages with a polygonal outer peripheral surface of the one so as to be slidable in the axial direction, and the guide portion is structured by the polygonal outer peripheral surface of the one and the polygonal inner peripheral surface of the other.

4. The output member of claim 1, wherein an inner peripheral surface of the movable shaft and an outer peripheral surface of the output shaft are engaged.

5. The output member of claim 4, wherein the positioning portion is a projection that is inserted in the end portion of the coil spring.

6. The output member of claim 1, wherein the output-side clutch member is molded integrally with the movable shaft.

7. A multi-shaft driving device comprising:
a plurality of the output members of claim 1 whose respective output shafts are connected via transmitting members to a plurality of movable mechanisms provided at a vehicle;
a plurality of input-side clutch members that are provided so as to correspond respectively and individually to the plurality of output members, and, when the movable shaft of the corresponding output member slides in the one direction, the input-side clutch member connects with the output-side clutch member, wherein drive power of a motor is transmitted to the input-side clutch member and the input-side clutch member is rotated; and a selector member that, by sliding the movable shaft of a selected output member among the plurality of output members from a usual position toward an urging direction by the urging member or by pushing and sliding the movable shaft of the selected output member against the urging member, connects the output-side clutch member of the selected output member to the corresponding input-side clutch member.

* * * * *